United States Patent [19]
Gellert et al.

[11] Patent Number: 5,935,616
[45] Date of Patent: Aug. 10, 1999

[54] INJECTION MOLDING APPARATUS HAVING INTER-MANIFOLD MELT TRANSFER BUSHINGS

[75] Inventors: Jobst Ulrich Gellert, Georgetown; Denis L. Babin, Acton, both of Canada

[73] Assignee: Mold-Masters Limited, Georgetown, Canada

[21] Appl. No.: 08/969,756

[22] Filed: Nov. 13, 1997

[51] Int. Cl.⁶ .................................................. B29C 45/22
[52] U.S. Cl. .......................................... 425/130; 425/572
[58] Field of Search .................................. 425/130, 549, 425/572

[56] References Cited

U.S. PATENT DOCUMENTS 5,223,275  6/1993  Gellert ...................................... 425/130
5,374,178  12/1994  Nakayama ............................... 425/130

Primary Examiner—Tim Heitbrink
Attorney, Agent, or Firm—Dalesman & Company

[57] ABSTRACT

Injection molding apparatus for multi-layer molding two materials with different injection temperatures having an insulative air space extending between front and rear heated melt distribution manifolds. Heated nozzles extending from the front manifold each have a central melt channel and one or more annular melt channels extending around it. Melt transfer bushings each having a central melt bore extend across the air space to convey melt from the rear manifold to one of the melt channels in each heated nozzle. In one embodiment, each melt transfer bushing has a head portion which provides a spacer between the two manifolds, and an elongated stem portion which extends through a bore through the front manifold to one of the heated nozzles. An air space around the stem portion provides thermal separation between the melt from the rear manifold and the front manifold which is at a higher temperature.

24 Claims, 7 Drawing Sheets

INJECTION MOLDING APPARATUS HAVING INTER-MANIFOLD MELT TRANSFER BUSHINGS

BACKGROUND OF THE INVENTION

This invention relates generally to multi-layer injection molding apparatus and more particularly to such apparatus having melt transfer bushings extending from a rear melt distribution manifold across an insulative air space into bores extending through a front melt distribution manifold.

Injection molding apparatus for making multi-layered protective containers for food or preforms or parisons for beverage bottles are well known. Often the inner and outer layers are made of a polyethylene terephthalate (PET) type material with one or more barrier layers made of a material such as ethylene vinyl alcohol copolymer (EVOH) or nylon. In some multi-cavity apparatus the two different melts are distributed through a single melt distribution manifold having different passages. However, preferably for materials such as these having different injection temperatures of about 565° F. and 400° F. respectively, the two melts are distributed through two different melt distribution manifolds. In some cases, the two melts are injected sequentially, while in other cases both coinjection and sequential injection are utilized. The two materials are injected through heated nozzles, each having a central melt channel and one or more annular melt channels extending around the central melt channel to a gate leading to the cavity.

As seen in U.S. Pat. No. 5,223,275 to Gellert which issued Jun. 29, 1993, it is also known to separate the front and rear melt distribution manifolds by a insulative air space with the melt from the rear melt distribution manifold flowing through a flat spacer washer mounted between the two manifolds. While this is suitable for some applications, it has the disadvantage that there is not sufficient thermal separation between the front melt distribution manifold and the melt from the rear melt distribution manifold flowing through it.

SUMMARY OF THE INVENTION

Accordingly, it is an object of the present invention to at least partially overcome the disadvantages of the prior art by providing multi-layer injection molding apparatus having melt transfer bushings extending forwardly from the rear melt distribution manifold into bores extending through the front melt distribution manifold.

To this end, in one of its aspects, the invention provides a multi-cavity hot runner injection molding apparatus for multi-layer molding having a front melt distribution manifold and a rear melt distribution manifold mounted in a mold extending substantially parallel to each other with an insulative air space therebetween. There are a number of heated nozzles, each having a rear end, a front end and a central melt channel extending therethrough from the rear end to the front end. Each heated nozzle has an inner annular melt channel extending to the front end around the central melt channel with a melt bore extending from the rear end of the heated nozzle to the inner annular melt channel. It also has an outer annular melt channel extending to the front end around the central melt channel and the inner annular melt channel with one or more melt bores extending from the rear end of the heated nozzle to the outer annular melt channel. The heated nozzles are mounted in the mold with the rear end of each heated nozzle abutting against the front melt distribution manifold. A first melt passage from a first melt source branches in the front melt distribution manifold and divides again to extend through the central melt channel and the one or more melt bores extending from the rear end of the heated nozzle to the outer annular melt channel and the outer annular melt channel in each heated nozzle to a gate adjacent the front end of the heated nozzle leading to a cavity in the mold. A second melt passage from a second melt source branches in the rear melt distribution manifold and extends through the first melt bore and the inner annular melt channel in each heated nozzle to the gate. There are a number of melt transfer bushings, each having a rear end, a front end, and a central melt bore extending therethrough from the rear end to the front end. Each melt transfer bushing is mounted in a position to extend from the rear melt distribution manifold forwardly across the insulative air space between the rear melt distribution manifold and the front melt distribution manifold and into a bore extending through the front melt distribution manifold to the first melt bore extending from the rear end of one of the heated nozzles to the inner annular melt channel. Thus, the central bore through each melt transfer bushing forms a part of the second melt passage.

In another of its aspects, the invention further provides a multi-cavity hot runner injection molding apparatus for multi-layer molding having a front melt distribution manifold and a rear melt distribution manifold mounted in a mold extending substantially parallel to each other with an insulative air space therebetween. There are a number of heated nozzles, each having a rear end, a front end and a central melt channel extending therethrough from the rear end to the front end. Each heated nozzle has an annular melt channel extending around the central melt channel to the front end with one or more melt bores extending from the rear end of the heated nozzle to the annular melt channel. The heated nozzles are mounted in the mold with the rear end of each heated nozzle abutting against the front melt distribution manifold. A first melt passage from a first melt source branches in the front melt distribution manifold and extends through the one or more melt bores and the annular melt channel in each heated nozzle to a gate adjacent the front end of the heated nozzle leading to a cavity in the mold. A second melt passage from a second melt source branches in the rear melt distribution manifold and extends through the central melt channel in each heated nozzle to the gate. There are a number of melt transfer bushings, each having a head portion at a rear end, an elongated stem portion extending from the head portion forwardly to a front end and a central bore extending therethrough from the rear end to the front end. Each melt transfer bushing is mounted in alignment with the central melt channel of one of the heated nozzles. The head portion extends between the rear melt distribution manifold and the front melt distribution manifold to be a spacer to provide the insulative air space therebetween. The elongated stem portion extends from the head portion forwardly into a bore extending through the front melt distribution manifold in alignment with the central melt channel through the aligned heated nozzle. Thus, the central bore through each melt transfer bushing receives an elongated pin which extends forwardly therefrom into the central melt channel in the aligned heated nozzle with the second melt passage from the second melt source extending along the elongated pin.

Further objects and advantages of the invention will appear from the following description taken together with the accompanying drawings.

DETAILED DESCRIPTION OF THE INVENTION

Figure 1:
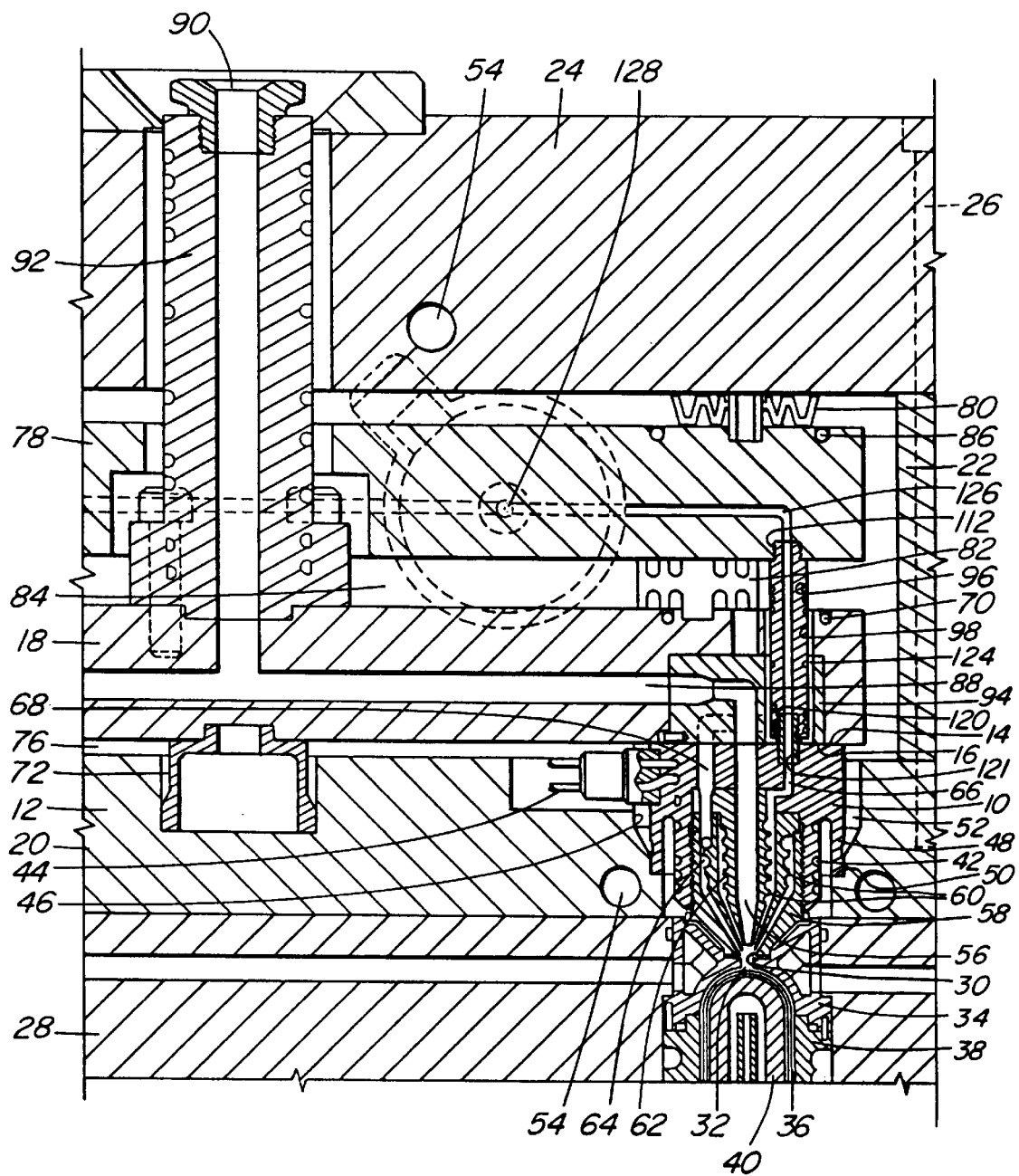
FIG. 1 is a partial sectional view of a portion of multi-layer injection molding apparatus having melt transfer bushings according to one embodiment of the invention.

Reference is first made to FIG. 1 which shows a portion of multi-cavity sprue gated injection molding apparatus for molding three layer preforms or other products by coinjection molding. A number of heated nozzles 10 are mounted in a mold 12 with a rear end 14 abutting against the front face 16 of a front steel melt distribution manifold 18. While the mold can have a greater number of plates depending upon the application, in this case, only a heated nozzle retainer plate 20, a manifold retainer plate 22 and a back plate 24 secured together by bolts 26, as well as a cavity retainer plate 28 are shown for ease of illustration. The front end 30 of each heated nozzle 10 is aligned with a gate 32 extending through a cooled gate insert 34 to a cavity 36. This cavity 36 for making beverage bottle preforms extends between a cavity insert 38 and a mold core 40 in a conventional manner.

Each heated nozzle 10 is heated by an integral electrical heating element 42 having a terminal 44. Each heated nozzle 10 is seated in an opening 46 in the nozzle retainer plate 20 with a rear collar portion 48 of each heated nozzle 10 received in a circular locating seat 50 extending around the opening 46. This provides an insulative air space 52 between the heated nozzle 10 and the surrounding mold 12 which is cooled by pumping cooling water through cooling conduits 54. Each heated nozzle 10 has a central melt channel 56 extending from its rear end 14 to its front end 30. Each heated nozzle 10 has an insert portion 58 made of several pieces 60 which fit together to form an inner annular melt channel 62 extending around the central melt channel 56 to the front end 30 and an outer annular melt channel 64 extending around the inner annular melt channel 62 and the central melt channel 56 to the front end 30. In this configuration, the heated nozzle 10 has a single melt bore 66 extending from its rear end 14 to connect to the inner annular melt channel 67 and four spaced melt bores 68 extending from the rear end 14 of the heated nozzle 10 to the outer annular melt channel 64.

The front melt distribution manifold 18 is heated by an integral electrical heating element 70. It is located by a central locating ring 72 and screws 74 extending into each heated nozzle 10 to have an insulative air space 76 extending between it and the surrounding cooled mold 12. A rear steel melt distribution manifold 78 is mounted in the mold 12 extending parallel to the front melt distribution manifold 18 with a number of insulative and resilient spacers 80 extending between it and the back plate 24. As can be seen, the front and rear manifolds 18, 78 are separated by spacers 82 to provide an insulative air space 84 between them. As described in more detail below, the rear melt distribution manifold 78 is heated by an integral electrical heating element 86 to a lower operating temperature than the front melt distribution manifold 18, and the insulative air space 84 between them provides sufficient thermal separation to allow this temperature difference to be maintained.

A first melt passage 88 extends from a central inlet 90 through a cylindrical manifold extension 92 and branches in the front melt distribution manifold 18 to extend through a melt dividing bushing 94 seated in the front face 16 of the front melt distribution manifold 18 in alignment with each heated nozzle 10. The melt dividing bushing 94 is made of three steel layers integrally brazed together as described in co-pending Canadian Application Serial No. 2,219,054 entitled, "Injection Molding Apparatus Having Melt Dividing Bushings" filed concurrently herewith. In this configuration, the first melt passage 88 divides in the melt dividing bushing 94 to extend to the central melt channel 56 and the four spaced melt bores 68 extending to the outer annular melt channel 64 in the aligned heated nozzle 10.

Figure 2:
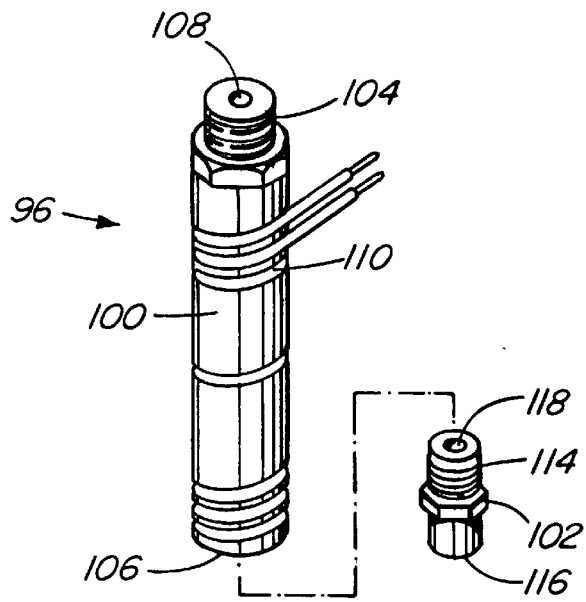
FIG. 2 is an isometric view of one of the melt transfer bushings shown in FIG. 1.

An elongated melt transfer bushing 96 according to the invention extends from the rear melt distribution manifold 78 across the insulative air space 84 and into a bore 98 which extends through the front melt distribution manifold 18 and each melt dividing bushing 94. While the transfer bushings 96 can be made of one piece, in this embodiment, as best seen in FIG. 2 each melt transfer bushing 96 has an elongated cylindrical body portion 100 with a connector bushing 102 extending forwardly from it. The elongated body portion 100 has a threaded rear end 104, a front end 106, a central melt bore 108 extending therethrough from the rear end 104 to the front end 106 and an integral electrical heating element 110 extending around the central melt bore 108. The threaded rear end of the elongated body portion 100 fits into a threaded seat 112 in the rear melt distribution manifold 78. The connector bushing 102 also has a threaded rear end 114, a front end 116 and a central melt bore 118 extending therethrough which matches the central melt bore 108 through the elongated body portion 100 of the melt transfer bushing 96. The threaded rear end 114 of the connector bushing 102 fits into a threaded seat 120 at the front end 106 of the elongated body portion 100 and the front end 116 of the connector bushing 102 fits into a matching seat 121 in the rear end 14 of the heated nozzle 10. This allows the length of the melt transfer bushing 96 to be adjusted to match the width of the air space 84 between the front melt distribution manifold 18 and the rear melt distribution manifold 78. The diameter of the elongated body portion 100 of the melt transfer bushing 96 is sufficiently smaller than the diameter of the bore 98 through the front melt distribution manifold 18 to provide an insulative air space 124 extending around the melt transfer bushing 96.

A second melt passage 126 extends from a second inlet 128 and branches in the rear melt distribution manifold 78 to extend through the aligned melt bores 108, 118 through each melt transfer bushing 96 to the aligned melt bore 66 extending from the rear end 14 of each heated nozzle 10 to the inner annular melt channel 62. While only a single heated nozzle 10 is shown for ease of illustration, it is understood that in a typical configuration there will be many heated nozzles 10 (eg. 32, 48, or 64) seated in the mold 12 to receive melt through the two melt passages 88, 126 which will have more complex configurations than shown.

In use, the injection molding system is assembled as shown in FIG. 1 and operates to form three layer preforms or other products with one barrier layer of a material such as EVOH or nylon between two layers of a PET type material as follows. Electrical power is applied to the heating element 70 in the front melt distribution manifold 18 and the heating elements 42 in the heated nozzles 10 to heat them to a temperature of about 565° F. Electrical power is also applied to the heating element 86 in the rear melt distribution manifold 78 and the heating elements 110 in the melt transfer bushings 96 to heat them to an operating temperature of about 400° F. Water is applied to the cooling conduits 54 to cool the molds 12 and the gate inserts 34. Hot pressurized melt is then injected into the central inlet 90 in the front melt distribution manifold 18 and the second inlet 128 in the rear melt distribution manifold 78 according to a predetermined injection cycle. First, an injection cylinder (not shown) injects pressurized melt such as a polyethylene terephthalate (PET) type material through the first melt passage 88 which splits in each melt dividing bushing 94 to extend through both the central melt channel 56 and the outer annular melt channel 64 of each heated nozzle 10 to the gates 32. After a small quantity of PET has been injected into the cavities 36, another pressurized melt which is a suitable barrier material such as ethylene vinyl alcohol copolymer (EVOH) or nylon is then simultaneously coinjected by another injection cylinder (not shown) through the second melt passage 126 which extends across the insulative air space 84 through the melt transfer bushings 96 and through the inner annular melt channel 62 of each heated nozzle 10 to the gates 32. When the cavities 36 are almost filled, the injection pressure of the barrier material is released which stops its flow, but the flow of PET continues until the cavities 36 are completely filled. Injection pressure of the PET is then released and, after a cooling period, the mold is opened for ejection. After ejection, the mold is closed and the cycle is repeated continuously with a frequency depending upon the wall thickness and number and size of cavities 36 and the exact type of materials being molded. Thus, as can be seen, in addition to conveying the barrier material across the insulative air space 84 between the two manifolds 18, 78, the melt transfer bushings 96 provide thermal separation for the barrier material and extra controlled heat if the barrier material is nylon as it flows through the front melt distribution manifold 18 which is at a higher temperature.

Figure 3:
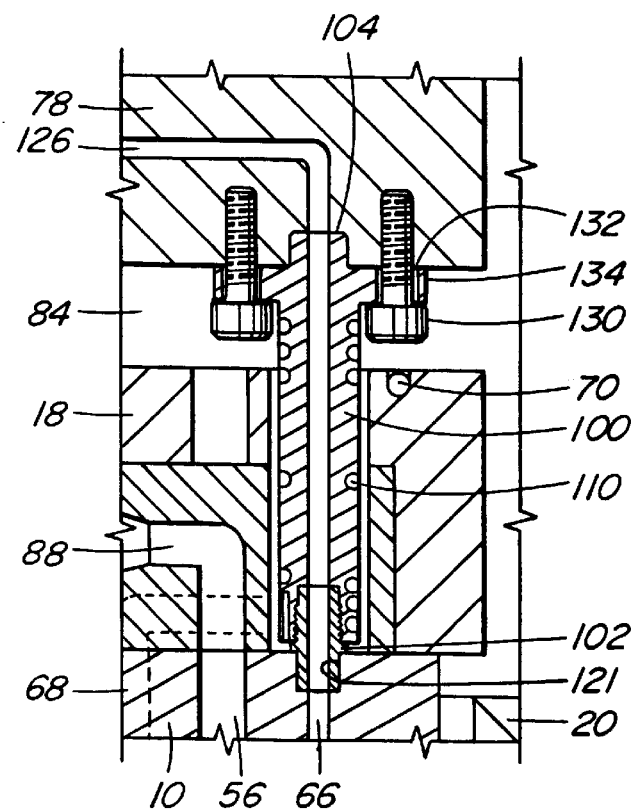
FIG. 3 is a sectional view showing a melt transfer bushing according to another embodiment of the invention.

Reference is now made to FIG. 3 showing injection molding apparatus according to another embodiment of the invention. As many of the elements of the various embodiments are the same as described above, not all common elements are described again and those that are described again have the same reference numerals as before. In this case, the rear end 104 of the elongated body portion 100 of each melt transfer bushing 96 is not threaded. Rather, the melt transfer bushing 96 is secured to the rear melt distribution manifold 78 by screws 130 extending into the rear melt distribution manifold 78 through holes 132 in a flange portion 134 of the elongated body portion 100. Otherwise, the structure and use of the melt transfer bushings 96 are the same as described above and need not be repeated.

Figure 4:
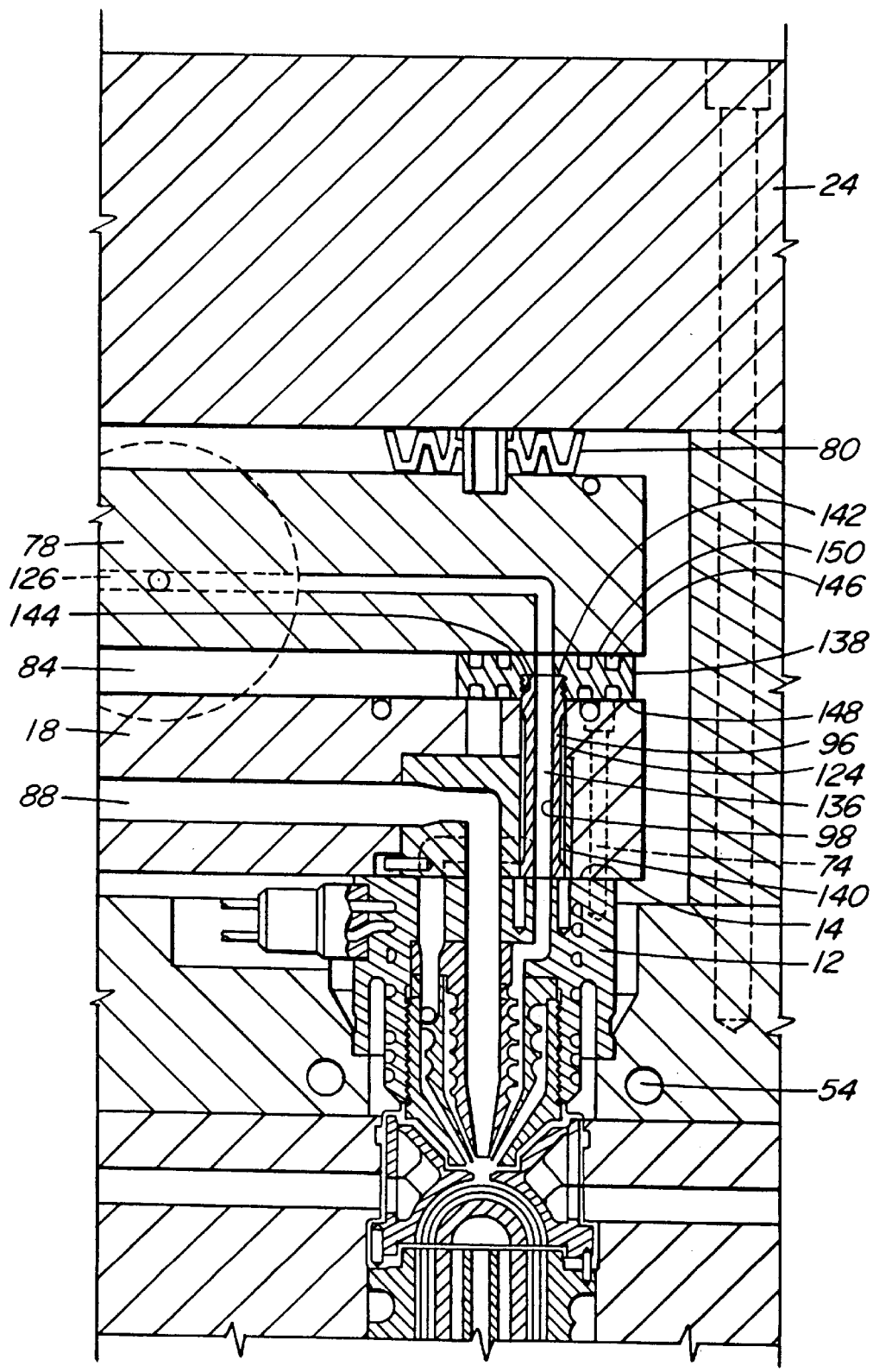
FIG. 4 is a partial sectional view of a portion of multi-layer injection molding apparatus having melt transfer bushings according to a further embodiment of the invention.
Figure 5:
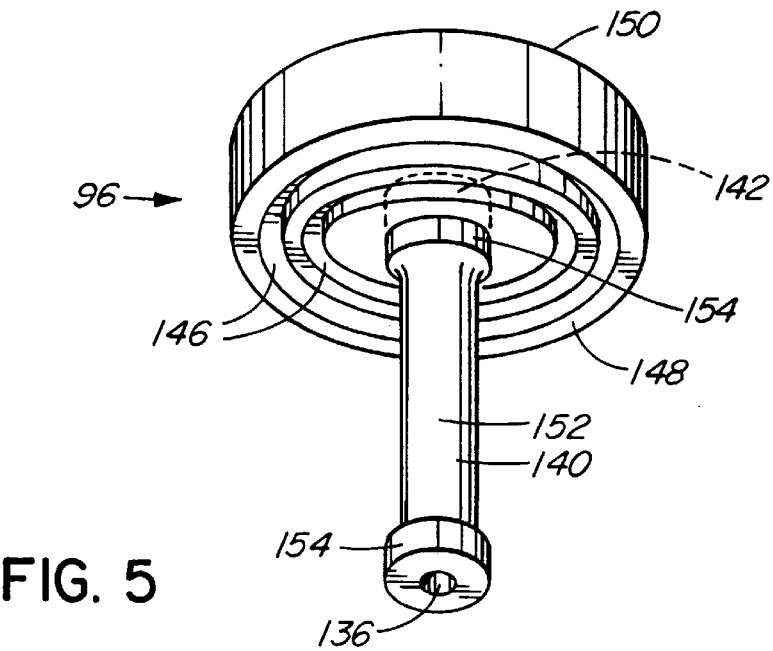
FIG. 5 is an isometric view of the melt transfer bushing shown in FIG. 3.
Figure 7:
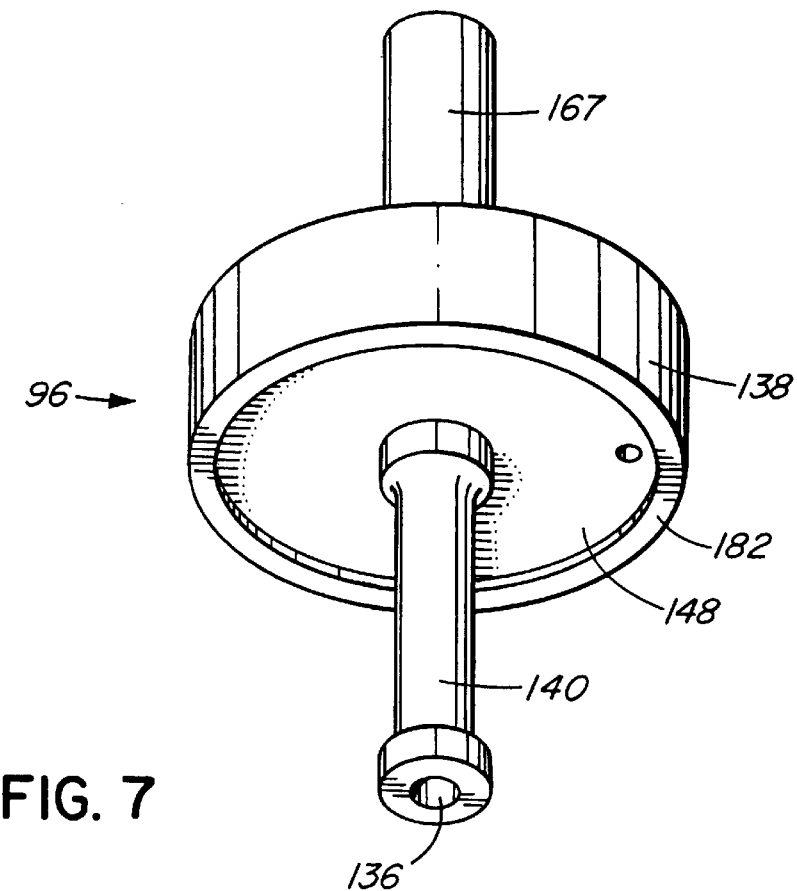
FIG. 7 is an isometric view of the melt transfer bushing shown in FIG. 6.

Reference is now made to FIGS. 4 and 5 showing injection molding apparatus according to a further embodiment of the invention. In this case, each melt transfer bushing 96 has a central melt bore 136 extending through a rear head portion 138 and an elongated stem portion 140 which extends forwardly from the rear head portion 138. The head portion 138 of each melt transfer bushing 96 forms a spacer to provide the insulative air space 84 between the front and rear melt distribution manifolds 18, 78. The elongated stem portion 140 extends forwardly through the bore 98 through the front melt distribution manifold 18 into contact with the rear end 14 of the aligned heated nozzle 10. While the melt transfer bushing 96 can be made of one piece, in the embodiment shown the elongated stem portion 140 has a threaded rear end 142 which is screwed into a threaded seat 144 in the head portion 138. This allows the elongated stem portion 140 to be made of wear resistant tool steel and the rear head portion 138 to be made of a less thermally conductive titanium alloy. As can be seen, the rear head portion 138 has a number of concentric grooves 146 on both its front and rear faces 148, 150 to reduce thermal conduction from the front melt distribution manifold 18 to the lower temperature rear melt distribution manifold 78. The elongated stem portion 140 has a smaller outer diameter portion 152 extending between two larger outer diameter portions 154 at its ends which forms the insulative air space 124 around the melt transfer bushing 96 as it extends through the bore 98 in the front melt distribution manifold 18. As mentioned above, this insulative air space 124 provides thermal separation for the barrier material as it flows through the front melt distribution manifold 18 which is at a higher temperature.

Figure 8:
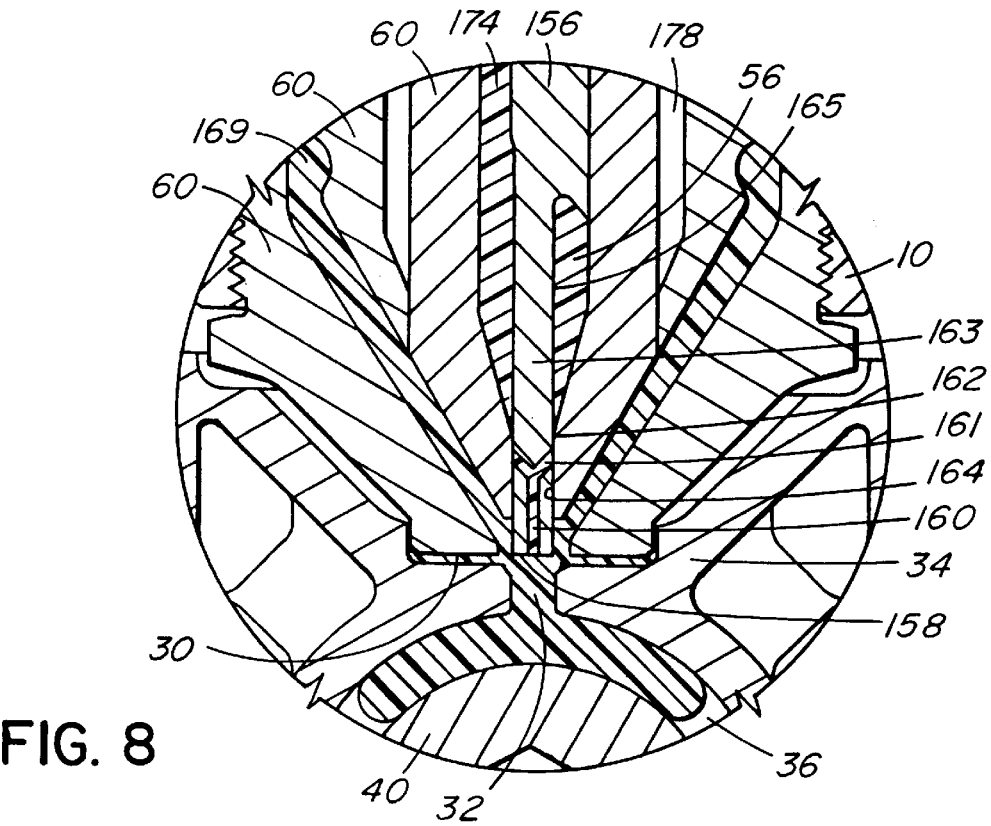
FIG. 8 is an enlarged sectional view showing the valve pin seen in FIG. 5 in the partially open position.
Figure 9:
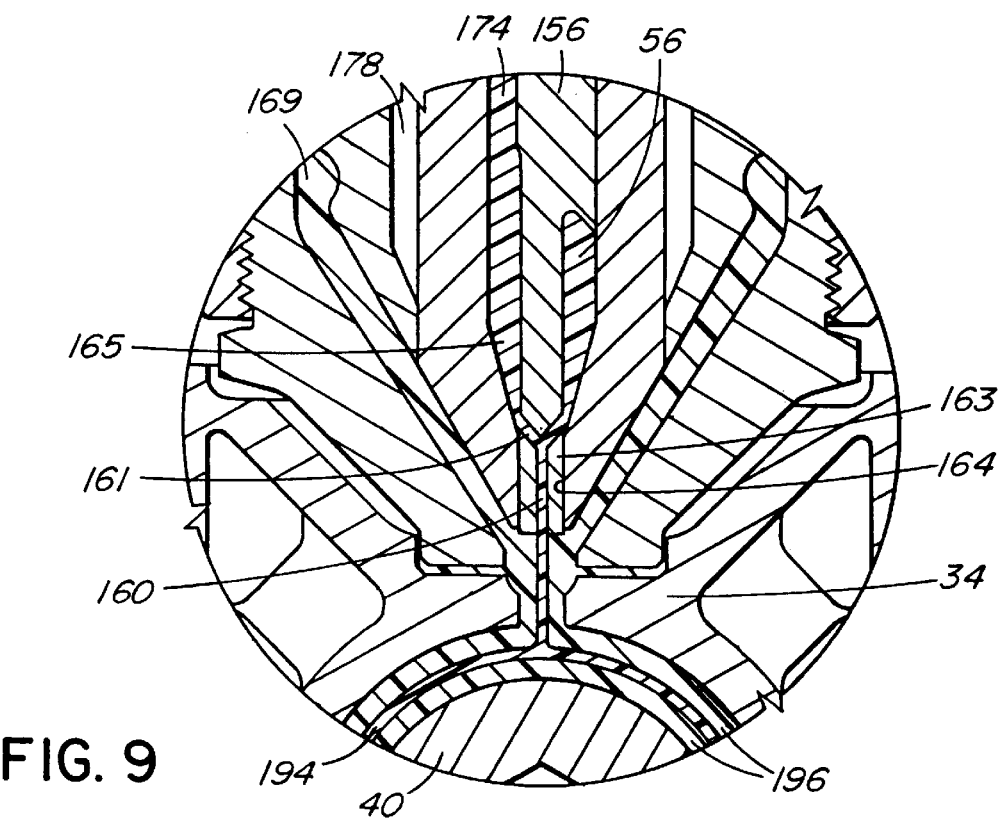
FIG. 9 is a similar view showing the valve pin in the fully open position.

Reference is now made to FIGS. 6 to 9 showing injection molding apparatus according to a different embodiment of the invention for molding three layer preforms or other products by simultaneous or coinjection molding. In this case, the apparatus has valve gates 32 provided by elongated valve pins 156 which extend through the central bore 136 through each melt transfer bushing 96 and the aligned central melt channel 56 in each heated nozzle 10. Each valve pin 156 has a front end 158 and a rear end or head 159. As best seen in FIGS. 8 and 9, each valve pin 156 has a central bore 160 extending rearwardly from its front end 158 to four lateral melt bores 161 which extend diagonally outward to the outer surface 162 of the valve pin 156. In this embodiment, each valve pin 156 has a reduced diameter portion 163 which fits in a reduced diameter portion 164 of the central melt channel 56 through the heated nozzle 10. The reduced diameter portion 163 of the valve pin 156 is longer than the reduced diameter portion 164 of the central melt channel 56 which thus forms a space 165 around the reduced diameter portion 163 of the valve pin 156. As described below, the elongated valve pins 156 are reciprocated by hydraulic actuating mechanism 166 according to a predetermined cycle between three different positions In this embodiment, each melt transfer bushing 96 also has a cylindrical neck portion 167 which extends rearwardly into an opening 168 through the rear melt distribution manifold 78, and the central bore 136 extends through this rear neck portion 167 as well.

As can be seen, in this embodiment, the insert portion 58 of each heated nozzle 10 only forms a single annular melt channel 169 extending around the central melt channel 56 with four spaced melt bores 170 extending rearwardly from the annular melt channel 169 to the rear end 14 of the heated nozzle 10. The first melt passage 88 for the PET divides in the melt dividing bushing 94 to extend to the four melt bores 170 leading to the annular melt channel 169 in the aligned heated nozzle 10. The second melt passage 126 for the barrier material branches in the rear melt distribution manifold 78 and extends through an L-shaped passage 172 drilled in the head portion 138 of each melt transfer bushing 96 to a longitudinal groove 174 machined to extend a predetermined distance rearwardly in the valve pin 156 from the space 165 around the reduced diameter portion 163 of the valve pin 156. In other embodiments, the groove 174 can extend helically around the valve pin 156 or the valve pin 156 can be small enough to let the barrier material flow around it. However, in view of the relatively low volume and low viscosity of the barrier material, it is preferable to have it flow through the groove 174. The valve pin 156 fits in the central bore 136 in the melt transfer bushing 96 tightly enough to prevent melt leakage as the elongated valve pin 156 reciprocates. Each melt transfer bushing 96 is retained in proper alignment by a small dowel 176 which extends between it and the front melt distribution manifold 18. The insert portion 58 of each heated nozzle 10 also has an annular insulative air space 178 extending between the central melt channel 56 and the surrounding annular melt channel 168 to provide some thermal separation between them. Further thermal separation is provided around the central melt channel 56 by a circle of spaced holes 180 drilled in the rear end 14 of each heated nozzle 10. Combined with the insulative air space 124 around the stem portion 140 of each melt transfer bushing 96, this provides continuous thermal separation for the barrier material as it flows through the higher temperature front melt distribution manifold 18 and the heated nozzles 10. The front face 148 of the head portion 138 of each melt transfer bushing 96 has an outer rim 182 which forms an insulative air space 184 between the head portion 138 and the front melt distribution manifold 18 to provide thermal separation between the front and rear melt distribution manifolds 18, 78.

The rear end or head 159 of the valve pin 156 is connected to a front piston 186 seated in a cylinder 188 in the back or cylinder plate 24. The actuating mechanism 166 also includes a rear piston 190, and the two pistons 186, 190 are driven by controlled hydraulic pressure applied through ducts 192 to reciprocate the valve pin 156 between three different positions. While hydraulic actuating mechanisms 166 are shown for ease of illustration, of course, other types of actuating mechanisms such as electromechanical mechanisms can be used for other applications.

Figure 6:
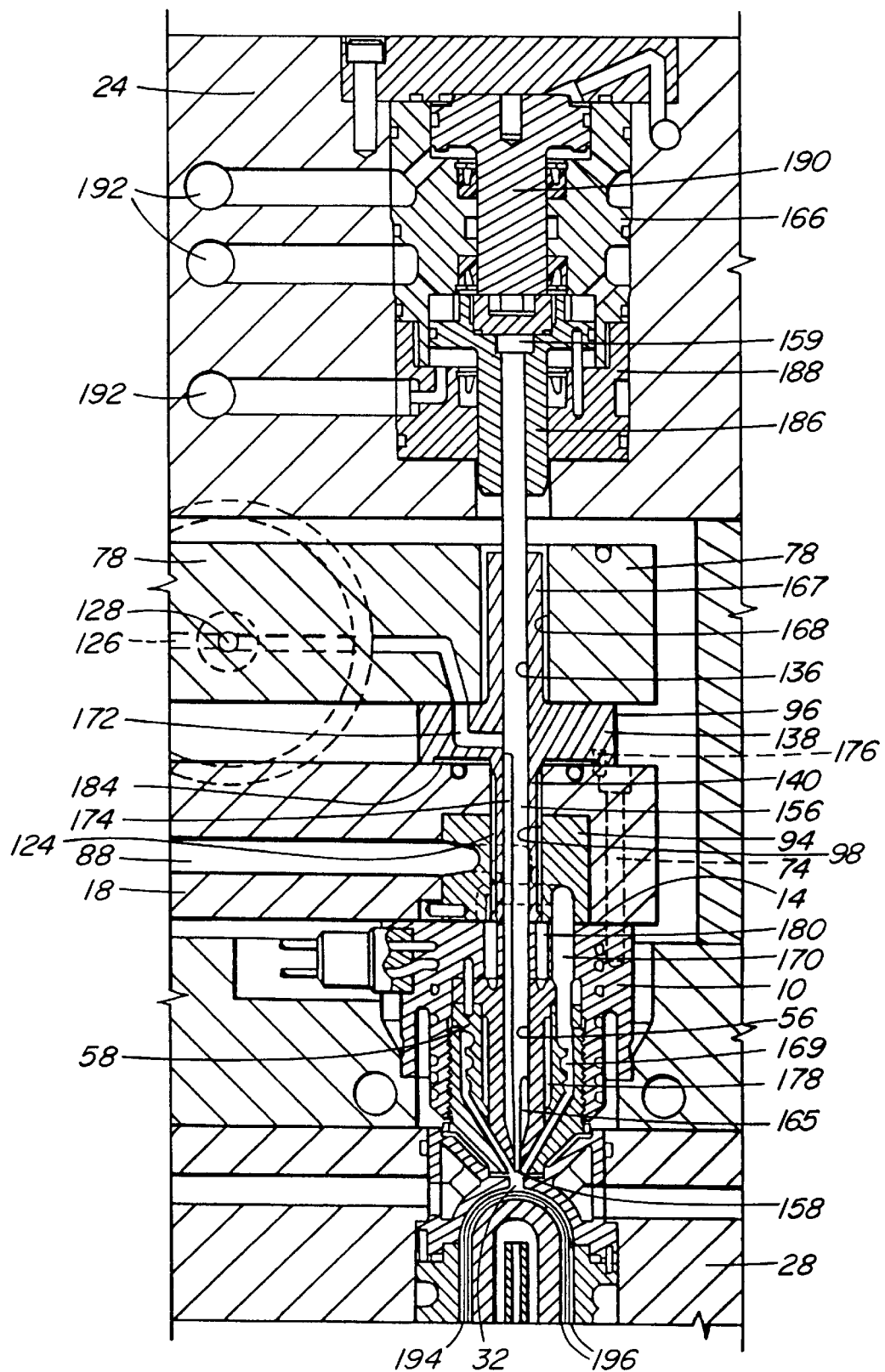
FIG. 6 is a partial sectional view of a portion of multi-layer valve gated injection molding apparatus having melt transfer bushings according to a further embodiment of the invention.

In use, each valve pin 156 is initially retracted only far enough to a first partially open position to allow PET to flow through the annular melt channel 169. In this embodiment, there is a double blockage of the barrier material flow in this middle position. As seen in FIG. 8, the lateral melt bores 161 in the valve pin 156 are too far forward to connect with the space 165 around the reduced diameter portion 163 of the valve pin 156. Furthermore, as seen in FIG. 6, the longitudinal or helical groove 174 in the valve pin 156 does not extend far enough rearwardly to connect with the L-shaped passage 172 in the melt transfer bushing 96 in this position. In other embodiments, it may only be necessary to use one or the other of these ways of blocking the flow of the barrier material.

Then, each valve pin 156 is retracted further to a second or open position shown in FIG. 9. In this position, the lateral melt bores 161 in the valve pin 156 are connected with the space 165 around the reduced diameter portion 163 of each valve pin 156 and the longitudinal groove 174 in the valve pin 156 does connect with the L-shaped passage 172 in the melt transfer bushing 96 which allows the barrier material to flow through the melt passage 126 into the cavities 36. As mentioned above, the central location of the bore 160 at the front end 158 of the valve pin 156 and the relatively small size of the groove 174 and the central bore 160 combine with the relatively low volume and low viscosity of the barrier material to ensure that the flow of the barrier material is reliable to provide a uniform and very thin layer of the barrier material which is quite expensive. As seen in FIG. 9, the barrier material flowing simultaneously with the PET splits the PET flow in two and provides a central layer 194 of the barrier material between two outer layers 196 of PET.

When the cavities 36 are almost filled, the front end of each valve member 156 is returned to the first position closing off the flow of the barrier material through the central bore 160. The flow of PET through the annular melt channel 169 continues until cavities 36 are completely filled. Each valve pin 156 is then driven to the third or forward closed position in which its front end 158 is seated in the gate 32 flush with the cavity 36. After a short cooling period, the mold is opened for ejection. After ejection, the mold is closed and the cycle is repeated continuously every 15 to 30 seconds with a frequency depending upon the wall thickness and number and size of cavities 36 and the exact materials being molded.

Figure 10:
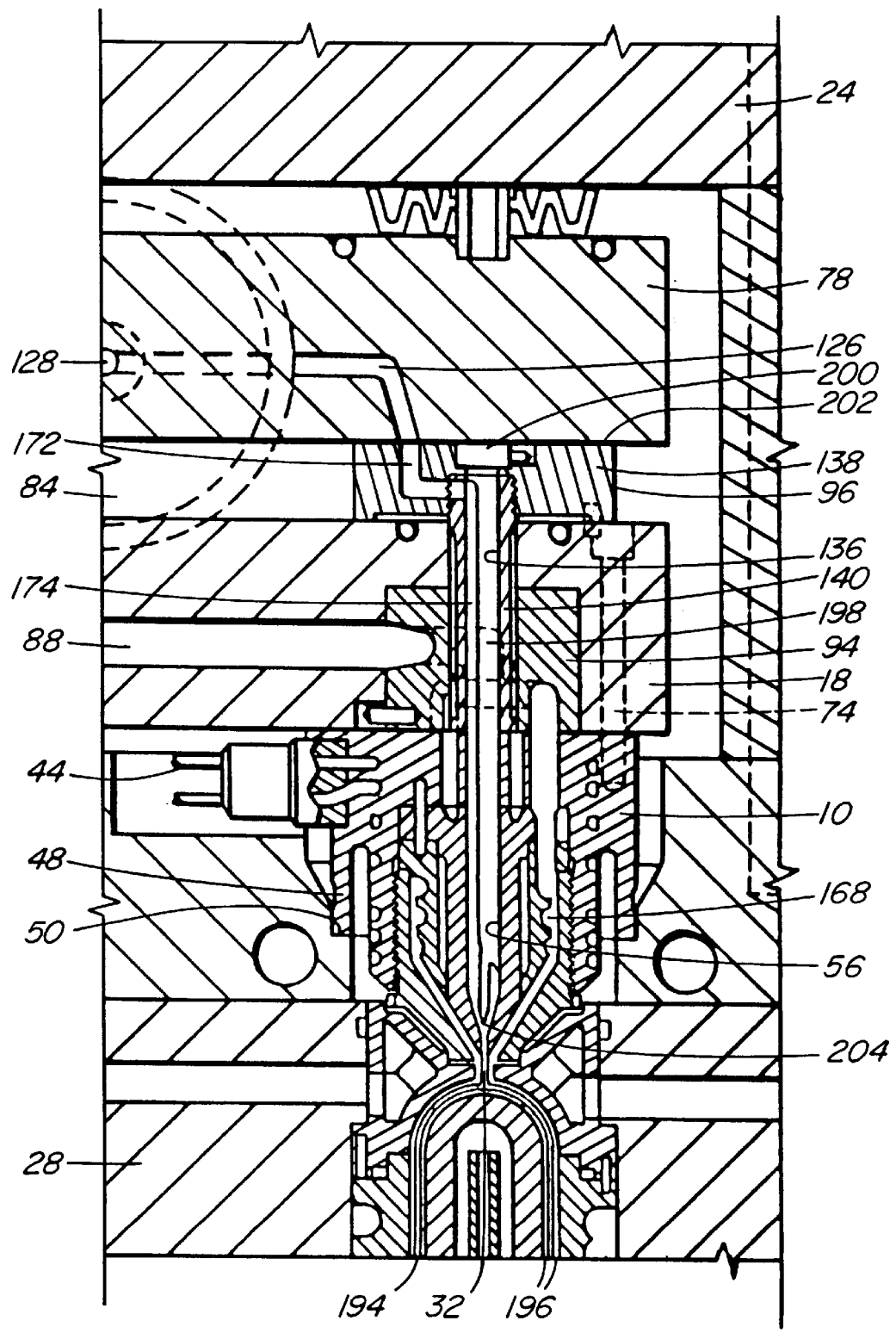
FIG. 10 is a partial sectional view of a portion of multi-layer injection molding apparatus having melt transfer bushings according to a still further embodiment of the invention.

Reference is now made to FIG. 10 showing injection molding apparatus according to another embodiment of the invention. In this case, each melt transfer bushing 96 again has the central bore 136 extending through an elongated stem portion 140 and a rear head portion 138 which forms a spacer between the two melt distribution manifolds 18, 78. An elongated pin 198 is fixed in place with its head 200 seated in the rear face 202 of the head portion 138 of each melt transfer bushing 96 and its partially tapered front end 204 adjacent to and in alignment with one of the gates 32. Although not seen in FIG. 10 because of the scale of the drawing, the elongated pin has a central bore 160 extending to its front end 204 and lateral bores 161 the same as seen in FIG. 9. During each cycle, PET is first injected through the first melt passage 88 and flows through the annular melt channel 168 in each heated nozzle 10 to the gates 32 leading to the cavities 36. A short time after the start of PET injection, a predetermined quantity of the less viscose barrier material is then simultaneously injected through the second melt passage 126 which forms a central layer 194 of the barrier material between two outer PET layers 196. When the cavities 36 are almost filled, the injection pressure of the barrier material is released which stops its flow and the PET injection is continued to completely fill the cavities 36. Injection pressure of the PET is then released and, after a short cooling period, the mold is opened for ejection. After ejection, the mold 12 is closed and the cycle is repeated continuously every 15 to 30 seconds with a frequency depending upon the wall thickness and number and size of the cavities 36 and the exact materials being molded.

While the description of the injection molding apparatus having melt transfer bushings extending across the air space 84 between the front and rear melt distribution manifolds 18, 78 has been given with respect to several embodiments, it will be evident that other various modifications are possible without departing from the scope of the invention as understood by those skilled in the art and as defined in the following claims. For instance, the description of the invention has been given for injection molding apparatus for three layer molding, but it can also be used with injection molding apparatus for five layer molding.

The embodiments of the invention in which an exclusive property or privilege is claimed is defined as follows:

1. In a multi-cavity hot runner injection molding apparatus for multi-layer molding having a front melt distribution manifold and a rear melt distribution manifold mounted in a mold extending substantially parallel to each other with an insulative air space therebetween, a plurality of heated nozzles, each heated nozzle having a rear end, a front end, a central melt channel extending therethrough from the rear end to the front end, an inner annular melt channel extending to the front end around the central melt channel with a first melt bore extending from the rear end of the heated nozzle to the inner annular melt channel and an outer annular melt channel extending to the front end around the central melt channel and the inner annular melt channel with at least one second melt bore extending from the rear end of the heated nozzle to the outer annular melt channel, the heated nozzles being mounted in the mold with the rear end of each heated nozzle abutting against the front melt distribution manifold, a first melt passage from a first melt source branching in the front melt distribution manifold and dividing again to extend through the central melt channel and the at least one second melt bore extending from the rear end of the heated nozzle to the outer annular melt channel and the outer annular melt channel in each heated nozzle to a gate adjacent the front end of the heated nozzle leading to a cavity in the mold, and a second melt passage from a second melt source branching in the rear melt distribution manifold and extending through the first melt bore and the inner annular melt channel in each heated nozzle to the gate, the improvement further comprising;

a plurality of melt transfer bushings, each melt transfer bushing having a rear end, a front end, and a central melt bore extending therethrough from the rear end to the front end, each melt transfer bushing being mounted in a position to extend from the rear melt distribution manifold forwardly across the insulative air space between the rear melt distribution manifold and the front melt distribution manifold and into a bore extending through the front melt distribution manifold to the first melt bore extending from the rear end of one of the heated nozzles to the inner annular melt channel, whereby the central bore through each melt transfer bushing forms a part of the second melt passage.

2. Injection molding apparatus as claimed in claim 1 wherein each melt transfer bushing extends through the bore through the front melt distribution manifold into sealing contact with the rear end of said one of the heated nozzles.

3. Injection molding apparatus as claimed in claim 2 wherein there is an insulative air gap between each melt transfer bushing and the surrounding front melt distribution manifold.

4. Injection molding apparatus as claimed in claim 3 wherein each melt transfer bushing has an integral electrical heating element, the electrical heating element having a helical portion extending around at least part of the central melt bore extending through the melt transfer bushing.

5. Injection molding apparatus as claimed in claim 2 wherein each melt transfer bushing comprises an elongated body portion and a connector bushing, the elongated body portion having a rear end, a front end, and a central melt bore extending therethrough from the rear end to the front end, the connector bushing having a rear end, a front end, and a central melt bore extending therethrough which matches the central melt bore extending through the elongated body portion, the connector bushing extending forwardly from the elongated body portion.

6. Injection molding apparatus as claimed in claim 5 wherein the rear end of the elongated body portion of each melt transfer bushing is threaded to screw into a threaded seat extending around the second melt passage in the rear melt distribution manifold.

7. Injection molding apparatus as claimed in claim 6 wherein one of the central melt bore at the front end of the elongated body portion of each melt transfer bushing and the first melt bore extending from the rear end of the aligned heated nozzle has a threaded seat therearound and one of the front and rear ends of the connector bushing is threaded, the threaded end of the connector bushing being screwed into said threaded seat in one of the central melt bore at the front end of the elongated body portion of each melt transfer bushing and the first melt bore extending from the rear end of the heated nozzle.

8. Injection molding apparatus as claimed in claim 2 wherein each melt transfer bushing has a head portion and an elongated stem portion, the head portion extending between the rear melt distribution manifold and the front melt distribution manifold to be a spacer to provide the insulative air space therebetween, the elongated stem portion extending from the head portion forwardly through the bore extending through the front melt distribution manifold.

9. The injection molding apparatus as claimed in claim 1 wherein there is an insulative air space between each heated nozzle and the surrounding mold.

10. The injection molding apparatus as claimed in claim 1 wherein the insulative air space between the rear melt distribution manifold and the front melt distribution manifold is formed by positioning a plurality of spacers therebetween.

11. The injection molding apparatus as claimed in claim 1 wherein there is an insulative air space between the front melt distribution manifold and the surrounding cooled mold.

12. The injection molding apparatus as claimed in claim 11 wherein the insulative air space between the front melt distribution manifold and the surrounding cooled mold is formed by positioning a central locating ring therebetween.

13. The injection molding apparatus as claimed in claim 1 wherein there is an insulative air space located between the rear melt distribution manifold and a back plate.

14. The injection molding apparatus as claimed in claim 11 wherein there is an insulative air space located between the rear melt distribution manifold and a back plate.

15. The injection molding apparatus as claimed in claim 14 wherein there is an insulative air space between each heated nozzle and the surrounding mold.

16. The injection molding apparatus as claimed in claim 1 wherein said insulative air spaces provide sufficient thermal separation to allow a temperature difference to be maintained between a first melt passing through the rear melt distribution manifold and a second melt passing through the front distribution manifold as said melts pass into said nozzles.

17. In a multi-cavity hot runner injection molding apparatus for multi-layer molding having a front melt distribution manifold and a rear melt distribution manifold mounted in a mold extending substantially parallel to each other with an insulative air space therebetween, a plurality of heated nozzles, each heated nozzle having a rear end, a front end, a central melt channel extending therethrough from the rear end to the front end and an annular melt channel extending around the central melt channel to the front end with at least one melt bore extending from the rear end of the heated nozzle to the annular melt channel, the heated nozzles being mounted in the mold with the rear end of each heated nozzle abutting against the front melt distribution manifold, a first melt passage from a first melt source branching in the front melt distribution manifold and extending through the at least one melt bore and the annular melt channel in each heated nozzle to a gate adjacent the front end of the heated nozzle leading to a cavity in the mold, and a second melt passage from a second melt source branching in the rear melt distribution manifold and extending through the central melt channel in each heated nozzle to the gate, the improvement further comprising;

a plurality of melt transfer bushings, each melt transfer bushing having a head portion at a rear end, an elongated stem portion extending from the head portion forwardly to a front end and a central bore extending therethrough from the rear end to the front end, each melt transfer bushing being mounted in alignment with the central melt channel of one of the heated nozzles, the head portion extending between the rear melt distribution manifold and the front melt distribution manifold to be a spacer to provide the insulative air space therebetween, the elongated stem portion extending from the head portion forwardly into a bore extending through the front melt distribution manifold in alignment with the central melt channel through the aligned heated nozzle, whereby the central bore through each melt transfer bushing receives an elongated pin which extends forwardly therefrom into the central melt channel in the aligned heated nozzle with the second melt passage from the second melt source extending along the elongated pin.

18. Injection molding apparatus as claimed in claim 17 wherein the elongated stem portion of each melt transfer bushing extends through the bore through the front melt distribution manifold with the front end of each melt transfer bushing abutting against the rear end of the aligned heated nozzle.

19. Injection molding apparatus as claimed in claim 18 wherein there is an insulative air gap between the elongated stem portion of each melt transfer bushing and the surrounding front melt distribution manifold.

20. Injection molding apparatus as claimed in claim 19 wherein the head portion of each melt transfer bushing has an off-center melt channel extending from an inlet on the rear end to join the central melt channel and form part of the second melt passage.

21. Injection molding apparatus as claimed in claim 20 wherein the off-center melt passage is L-shaped.

22. Injection molding apparatus as claimed in claim 20 wherein the elongated pin is a valve pin and further including actuating mechanism to reciprocate the valve member between a retracted open position and a forward closed position.

23. Injection molding apparatus as claimed in claim 22 wherein each melt transfer bushing further comprises a neck portion extending rearwardly from the head portion into an opening in the rear melt distribution manifold and the elongated valve pin fits in the central bore in the neck portion tightly enough to prevent melt leakage as the elongated valve pin reciprocates.

24. Injection molding apparatus as claimed in claim 20 wherein the elongated pin is a fixed pin with a longitudinally extending melt groove therein.

* * * * *